United States Patent [19]

Heyden

[11] 4,393,738
[45] Jul. 19, 1983

[54] CUTTING ROLL FOR PRODUCING SHAPED INNER AND OUTER CUTS AND A METHOD FOR MAKING SAME

[75] Inventor: Günter Heyden, Neuwied, Fed. Rep. of Germany

[73] Assignee: Winkler & Dunnebier Maschinenfabrik und Eisengiesserei GmbH & Co. KG, Neuwied, Fed. Rep. of Germany

[21] Appl. No.: 305,143

[22] Filed: Sep. 24, 1981

Related U.S. Application Data

[63] Continuation of Ser. No. 123,634, Feb. 22, 1980, abandoned.

[30] Foreign Application Priority Data

Feb. 24, 1979 [DE] Fed. Rep. of Germany ....... 2907325

[51] Int. Cl.³ .......................... B26D 1/62; B21K 5/12
[52] U.S. Cl. .................................. 83/663; 76/101 A; 76/DIG. 5; 83/346; 83/698
[58] Field of Search ................. 83/346, 347, 669, 672, 83/911, 698, 663; 76/107 C, 107 R, 101 A, DIG. 5

[56] References Cited

U.S. PATENT DOCUMENTS 3,106,121 10/1963 Novick .............................. 83/669 X
3,257,885 6/1966 Hornung ................................. 83/346
3,905,283 9/1975 Baker .......................... 76/DIG. 5 X
3,916,749 11/1975 Armelin ........................ 76/101 A X
3,977,283 8/1976 Helm ................................. 83/346 X
4,008,976 2/1977 Holzl ........................... 76/101 A X Primary Examiner—Frank T. Yost
Attorney, Agent, or Firm—Allison C. Collard; Thomas M. Galgano

[57] ABSTRACT

A cutting roll for producing shaped inner and outer cuts on moving webs or discrete blanks of paper or the like and, more particularly, for the production of blanks for envelopes on envelope machines, includes a base or parent member carrying a web-like blade whose development corresponds to the contours of the format to be cut. The blade is composed of one or more weld beads disposed one above another and one beside another horizontally on the base member.

2 Claims, 4 Drawing Figures

CUTTING ROLL FOR PRODUCING SHAPED INNER AND OUTER CUTS AND A METHOD FOR MAKING SAME

This application is a continuation, of application Ser. No. 123,634, filed 2/22/80, now abandoned.

The invention relates to a cutting roll for producing inner and outer cuts on moving webs or discrete blanks of paper or the like. More particularly, it relates to such a cutting roll for the production of blanks for envelopes on envelope machines.

Rolls of this kind typically comprise a cylindrical base or parent member carrying a web-like blade whose development corresponds to the contours of the format to be cut. In known constructions of cutting rolls of this kind, the base member and the blade form a homogeneous unit—i.e., the blade is made of the same material as the base member, material being removed from the outside surface of the cylinder to leave the blade as a sufficiently high strip several millimeters high and wide.

Cutting rolls of this kind have considerable disadvantages. Since the base member and the blade are a homogeneous unit, the complete item must be made of an expensive material whose special strength properties are basically needed only for the cutting edge of the blade. Also, it is expensive in time and machinery to machine the entire generated surface of a cylinder on a copy miller or by electroerosion just to produce a narrow web. There is also the question of the costs of subsequent heat treatment to consider. In addition to their high initial costs, another disadvantage of conventional cutting rolls is that once the wear of the blade exceeds a permissible level, they can be neither sharpened nor repaired.

It is therefore an object of the invention provide a cutting roll whose base member is made of a cheap material, which requires very short machining times, which needs no heat treatment after machining and whose blade can be repaired, if damaged, or sharpened after the permissible limit of wear has been exceeded.

This is attained according to the invention by the provision of a cutting roll having a blade which comprises one or more weld beads disposed one above another and one beside another longitudinal arranged on a base member.

An advantage of this inventive solution is that the base member can be made of a cheap steel. In addition, the weld beads thereon can be arranged and shaped appropriately so as to require only minor machining to form the cutting edge of the blade. Moreover, if a suitable welding material is used, a long blade life is assured without heat treatment and in the event of the blade being damaged or becoming heavily worn, the blade can be repaired by being built up by welding or resharpening.

Other objects and features of the present invention will become apparent from the following detailed description, considered in connection with the accompanying drawing, which discloses several embodiments of the invention. It is to be understood, however, that the drawing is designed for the purpose of illustration only, and not as a definition of the limits of the invention.

In the drawing, wherein similar reference characters denote similar elements through the several views.

Figure 1:
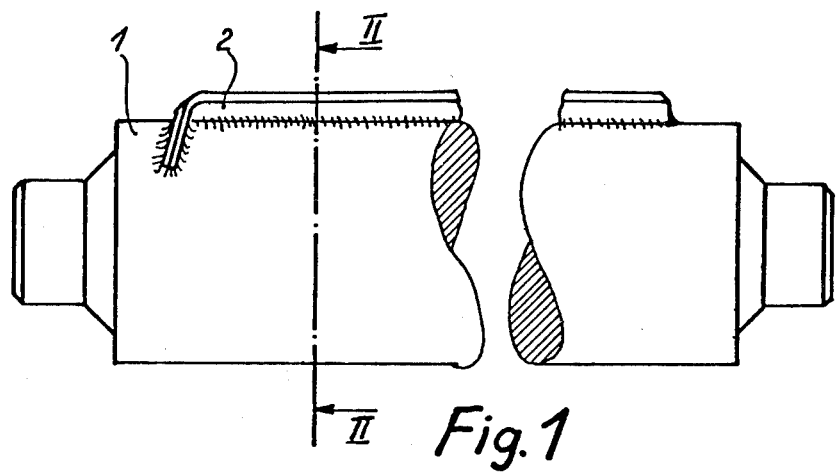
FIG. 1 is a fragmentarily-illustrated front view of a cutting roll embodying the present invention.
Figures 2, 3:
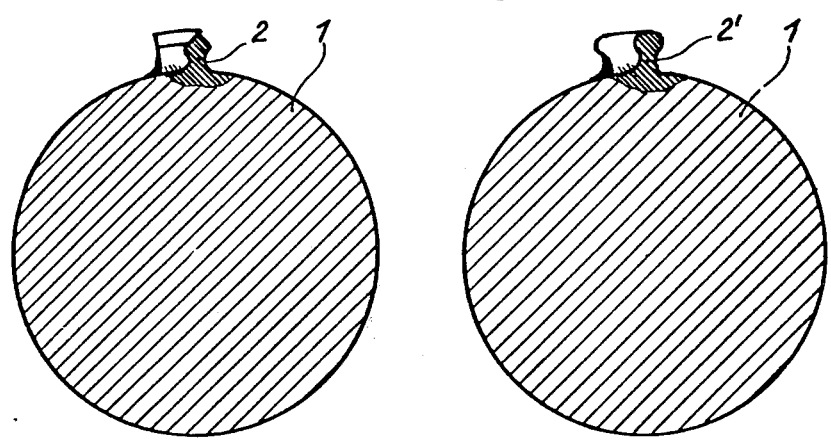
FIG. 2 is a sectional view taken along line II—II of FIG. 1.
FIG. 3 is a sectional view taken along line II—II of FIG. 2, but before machining of the weld beads.

Referring now in detail to the drawing, FIG. 1 illustrates a cutting roll in the form of a rigid parent or base member 1 on which a blade 2 is disposed. Member 1 is made of a readily weldable steel. Blade 2 is composed of a number of weld beads made of a high alloy wear-resistant and relatively hard steel and disposed one above another and one beside another and welded to the base member 1. Upon completion of welding, the beads are in the form of a web 2' which is rigidly anchored to member 1 and whose cross-section can be seen in FIG. 3. When the top widened region of the web 2' is machined to a shape resembling a pitched roof, a cutting blade 2 requiring no further treatment results, as shown in FIG. 2.

Figure 4:
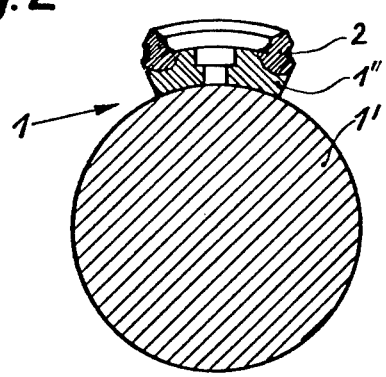
FIG. 4 is a sectional view through a cutting roll whose parent member is a cylindrical inner roll with a tubular segment disposed thereon.

A further embodiment of the cutting roll is shown in FIG. 4 which is especially useful for small blades requiring frequent exchange. In this embodiment, the base member 1 is in the form of a support cylinder 1' to which a tubular segment 1" is screwed. The same is made of a readily weldable steel and carries the blade 2 which, in this case, is a closed window blade similar in shape and in the nature of its production to the blade 2 hereinbefore described with reference to FIGS. 1 and 2.

While only several embodiments of the present invention have been shown and described, it will be obvious that many modifications and changes may be made thereunto, without departing from the spirit and scope of the invention.

What is claimed is:

1. A method of making a cutting roll for producing shaped inner and outer cuts on moving webs or discrete blanks of paper or the like, comprising the steps of:

welding a multiplicity of weld beads made of a highly wear-resistant steel alloy on a base member made of a readily weldable steel so as to form a web-like blade whose cutting edge corresponds to the contour of the desired cutting pattern, said weld beads being disposed one above the other and one beside the other longitudinally along and on said base member, said weld beads being arranged and disposed to substantially assume the desired blade profile with a cutting edge having a rounded cross-sectional profile supported on a narrower neck portion so as to require only minor machining to form the cutting edge of the blade; and sharpening in a single machining operation the cutting edge of said blade to a shape resembling a pitched roof.

2. A cutting roll made according to claim 1.

* * * * *